(12) United States Patent
Simon

(10) Patent No.: US 7,840,314 B2
(45) Date of Patent: Nov. 23, 2010

(54) COMPUTER PERIPHERAL DEVICE METHOD AND APPARATUS

(75) Inventor: Anthony Luke Simon, West Bloomfield, MI (US)

(73) Assignee: General Motors LLC, Detroit, MI (US)

( * ) Notice: Subject to any disclaimer, the term of this patent is extended or adjusted under 35 U.S.C. 154(b) by 1350 days.

(21) Appl. No.: 11/261,999

(22) Filed: Oct. 28, 2005

(65) Prior Publication Data

US 2007/0100507 A1    May 3, 2007

(51) Int. Cl.
    *G05D 1/00* (2006.01)
(52) U.S. Cl. .......................... 701/1; 340/539.1
(58) Field of Classification Search ............ 701/1, 701/29, 30, 45; 340/431, 539.1, 636.15; 439/357, 354; 180/128; 303/7; 307/10.12 R, 307/112 R
See application file for complete search history.

(56) References Cited

U.S. PATENT DOCUMENTS

| | | | |
|---|---|---|---|
| 6,023,706 A * | 2/2000 | Schmuck et al. ............ 707/200 |
| 7,047,114 B1 * | 5/2006 | Rogers ........................ 701/21 |
| 7,123,164 B2 * | 10/2006 | Zoladek et al. ........ 340/870.07 |
| 7,142,959 B2 * | 11/2006 | Oesterling et al. ............ 701/29 |
| 7,228,211 B1 * | 6/2007 | Lowrey et al. ................ 701/29 |
| 7,358,851 B2 * | 4/2008 | Patenaude et al. ........... 340/438 |
| 2003/0232619 A1 * | 12/2003 | Fraser ........................ 455/420 |

* cited by examiner

*Primary Examiner*—Khoi Tran
*Assistant Examiner*—Brian J Broadhead (57) ABSTRACT

A vehicle peripheral device system comprising a first peripheral state manager that manages a persistent connection between a computing device and a vehicle and a second peripheral state manager that manages on-demand connections between the computing device and the vehicle, wherein the vehicle is presented to a user of the computing device as a persistent peripheral device when either the persistent connection or the on-demand connection is available, wherein at least some on-demand connections are initiated by the computing device requiring access to the vehicle device.

11 Claims, 7 Drawing Sheets

COMPUTER PERIPHERAL DEVICE METHOD AND APPARATUS

TECHNICAL FIELD

This invention relates to a computer peripheral device method and apparatus.

BACKGROUND OF THE INVENTION

It is known to remotely connect a computer system to a vehicle for many purposes. In one example, the remote system is coupled to a vehicle device through a mobile calling connection such as a cellular or digital phone call. In another example, paging communications or a mobile packet data network are used. The vehicle is then either provided instructions, data or objects from the remote station, and provides information to the remote station. These types of services are known as telematics services.

In another known example, a short-range wireless connection is made to a vehicle device. For example, a home computer is connected over a short-range wireless network connection to a vehicle that can be used to synchronize music files stored on a vehicle playback system with those stored on the home computer. Additionally, telematics services may be provided over short-range connections if a connection is available.

In these known examples, the vehicle is considered either a mobile unit for which connections are made for specific purposes or a node on a mobile network.

SUMMARY OF THE INVENTION

Advantageously, in one example, vehicle peripheral device system is provided comprising: a first peripheral state manager that manages a persistent connection between the vehicle and the computer; and a second peripheral state manager that manages on-demand connections between the vehicle and the computer, wherein the vehicle is presented to a user of the computer as a persistent peripheral device, wherein at least some of the on-demand connections are initiated by the computer requiring access to the vehicle device.

Advantageously, in another example, a computer peripheral device system is provided comprising a peripheral device installed on a vehicle; and software running on a computer for connection to the peripheral device, the software including, an actual connection manager for maintaining a connection to the peripheral device when the vehicle is in a location capable of either wired connection to the computer or persistent wireless connection with the computer, and a virtual connection manager for maintaining a virtual connection to the peripheral device by selectively connecting to the vehicle using a remote connection function when the computer requires services of the vehicle peripheral device, wherein during the virtual connection the vehicle is presented as an available peripheral device to a user of the computer.

Advantageously, in another example, a computer peripheral device method is provided including the steps of: initiating a first connection from a computer to a vehicle wherein the first connection is a wired or a short range wireless connection; designating on the computer the vehicle as an available peripheral device if the first connection is achieved; initiating a second connection from the computer to the vehicle if the first connection is not available, wherein the second connection is not a short range wireless connection or a wired connection; designating on the computer the vehicle as the available peripheral device if the second connection is achieved; disconnecting the second connection while maintaining the vehicle as the available peripheral device, and reestablishing connection to the vehicle upon computer demand for services from the vehicle.

DESCRIPTION OF THE PREFERRED EMBODIMENT

Figure 1:
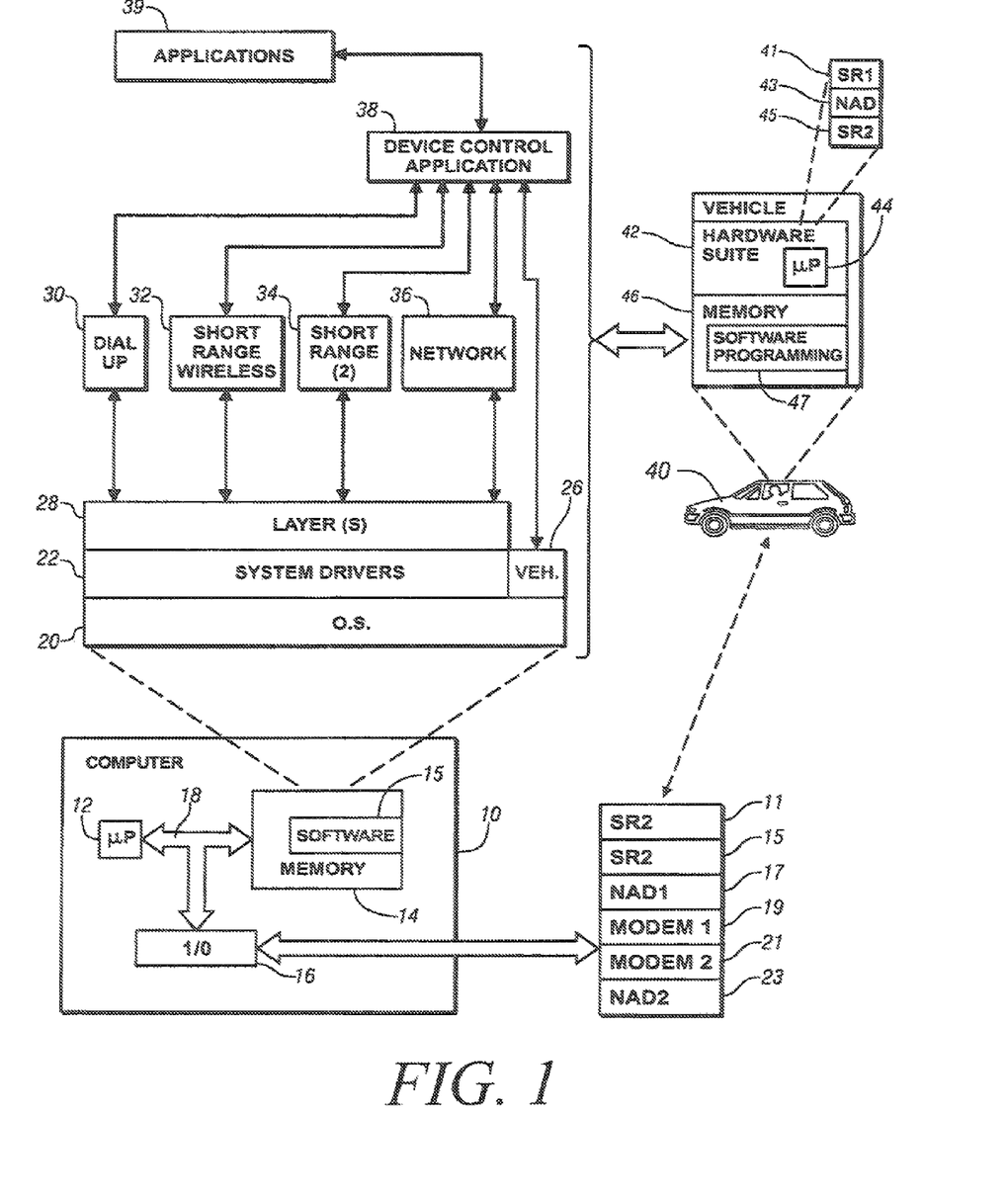
FIG. 1 is an example schematic of a system for a computer peripheral device.

Referring now to FIG. 1, a computer 10, such as a personal computer for in-home use by a user, is depicted schematically to represent components and functions known and available on computers along with additional features as specified herein. The computer 10 includes a microprocessor 12 with associated memory components 14 of a known type. Stored in a part of the memory components 14, for example a hard disk drive, is software 15 for operating the computer 10. The computer 10 also includes one or more data buses 18 for transferring data between the processor 12, memory components 14, input/output interfaces 16 and other devices of a known type included in computer 10. Example input output interfaces 16 may include communication devices such as short range transceivers 11 and 15 that may implement different standard protocols for short range wireless communications, a network access device 17 that may implement standard wired network interface such as to a local area network, modems 19 and 21 that may interface with telephone lines or cable access systems and network access device 23 that may include a wireless mobile calling transceiver with either built-in modem capabilities or that operates in conjunction with modem 19. Example implementations of each of the communications devices 11, 15, 17, 19, 21 and 23 are well known to those skilled in the art.

The software 15 includes the computer operating system 20, system drivers 22 and 26, and other layers 28 as called for by the operating system architecture that may include USB stacks, library files, etcetera as is known in the art. Higher level applications in this example include components 30, 32, 34, 36 that interface applications with specific driver functions in the system driver level. While the operating system structure may dictate the final structure of drivers and associated interface and control files, this example illustrates a vehicle driver component 26 at the system driver level. This structure will vary with different operating systems and one skilled in the art will know how to adapt the functions set forth herein to various architectures in view of the information provided herein. The vehicle driver component 26 may be available as part of the operating system installation or may be installed separately by a user of the computer, with these design choices set as an implementer of the system desires.

The vehicle driver component 26 interacts with the operating system for peripheral device service functions and also interacts with device control application 38. Device control application 38 (shown here as a higher level application, but may be provided at a lower level) interacts with the various device driver function interfaces 30, 32, 34, 36 and the vehicle driver 26 and with various applications 39 from which services for peripheral devices might be desired by a user of computer 10.

In general, upon request from the operating system 20 or an application 39, services may be desired from a peripheral device that may be designated generally as the vehicle 40 or specifically a device 42 integrated in the vehicle 40. In another example, device 42 is not integrated into the vehicle but is portable and may be located in a vehicle when a user is in the vehicle.

In one example, vehicle 40 includes hardware 42 with a microprocessor 44 and software programming 47 in at least one memory unit 46. The hardware or device 42 preferably includes a suite of any suitable hardware for use in an in-vehicle device, including additional memory, and interfaces with various vehicle systems. References 41, 43 and 45 indicate interface devices included in the in-vehicle hardware or device 42 and represent in this example a first short range transceiver 41, a network access device such as for accessing a mobile telephone and/or packet data network 43 and a second short range transceiver 45. For example, short-range transceiver 41 may be a Bluetooth® or similar transceiver and short-range transceiver 43 may be an 802.11 or similar transceiver.

In operation, the computer 10 with the vehicle driver 26 and device control application 38 attempts to identify and indicate availability of peripheral devices in a known manner. The various interfaces are utilized to determine whether a vehicle is available for connection to the computer by utilizing the various interface devices 11, 15, 17, 19, 21 and 23 to attempt a communication with vehicle 40. For example, the computer 10 may attempt to contact the vehicle through short-range transceivers 11 and 15. If communication is established through either of these devices, for example if the vehicle is parked in proximity to the computer 10 allowing short range communications, then the operating system recognizes the in-vehicle device 42 as a peripheral to the computer 10 with working connections. In one example, a user may utilize a SUB cable to connect a computer to the vehicle.

If short-range communication is not established, the computer attempts to communicate with the vehicle through another interface. For example, the computer 10 utilizes one of the modems 19 or 21 or network access device 23 to place a call or other long-range connection to the vehicle 40. The vehicle utilizing a wireless network access device answers the call and allows the connection with computer 10. Then the operating system recognizes the in-vehicle device 42 as a peripheral to the computer 10.

In another example, the vehicle may have a short-range transceiver that connects to a local "hot spot" or access point transceiver that allows connection to the Internet. In this example, the in-vehicle device may send a message to computer 10, letting computer 10 know its IP address. Then computer 10 attempts a connection through its Internet connection and if a connection is made, recognizes the in-vehicle device 42 as a peripheral to the computer 10.

In yet another example, the vehicle may have a short-range transceiver that connects to a local "hot spot" and is programmed with its own Internet phone number. Upon access by the vehicle to the Internet through any local hot spot or access point, the computer 10 can call the in-vehicle device 42 at the Internet telephone number associated with the in-vehicle device 42, establish a connection to the in-vehicle device 42, and recognize the device 42 as a peripheral device to the computer 10.

In one example, the device 42 is installed on vehicle 40 and acts as a peripheral device for computer 10. Software running on computer 10 manages connection between the computer 10 and device 42. The software includes an actual connection function for maintaining a connection to the peripheral device 42 when the vehicle is in a location capable of either wired connection to the computer or persistent wireless connection with the computer. Additionally, the software includes a virtual connection function for maintaining a virtual connection to the peripheral device 42 by selectively connecting to the vehicle using a remote connection function when the computer requires services of the vehicle peripheral device. Whether with a persistent connection or a virtual connection, the software presents the vehicle, or device 42, as an available peripheral device to a user of the computer.

In an example, computer 10 is spatially separated from a vehicle. Device driver software 26 on the computer operates with the operating system and other components necessary according to the operating system architecture allowing the computer 10 to recognize the vehicle 40 or in-vehicle device 42 as a peripheral of the computer 10. The computer 10 operates a first connection to the vehicle 40 or device 42 when the vehicle 40 or device 42 is in proximity of the computer 10 allowing a short range connection, and operates a second connection to the vehicle 40 or device 42 when the vehicle 40 or device 42 is not in proximity of the computer 10 and the short range connection is not available.

In one example, to manage connections, the software on the computer 10 is initiated to obtain a first connection to the device 42 in vehicle 40 when a wired or short-range wireless connection is available to the vehicle. When the first connection is established, the vehicle or device 42 is designated on the computer 10 as a peripheral device. The software initiates a second connection from the computer 10 to the vehicle 40 or device 42 if the first connection is not available. The second connection uses a communication device 17-23 to establish a connection other than a short-range connection or a wired connection. Upon successfully achieving the second connection, the vehicle or device 42 is designated or presented as an available peripheral device. Thus, a user of the computer viewing screens or windows indicating status of the peripheral devices will have the ability to see the vehicle 40 or in-vehicle device 42 as an available peripheral device. Since the second connection may be difficult or expensive to maintain, the second connection is disconnected during non-use of services from the vehicle by the computer 10, while maintaining the vehicle 40 or device 42 as the available peripheral device within the control of the computer 10. Upon request for services from the vehicle 40 or in-vehicle device 42 (or from the computer 10 by the vehicle 40 or device 42), connection is reestablished between the computer 10 and the vehicle 40 or in-vehicle device 42 allowing the services to be carried out.

In operation, the software 15 operates as a first peripheral state manager when a persistent connection is available between the computer and the vehicle. It also operates as a second peripheral state manager where on-demand connections occur between the computer 10 and the vehicle 40. The vehicle is presented to a user of the computer as an available persistent peripheral device with on-demand connections initiated by the computer for access to the vehicle device 42. For example, when the user operates the computer and desires a service from the vehicle such as copying a file from the computer 10 memory to the vehicle device 42, the system requires access to the vehicle device 42 and initiates the on-demand connection (if the persistent connection is not available). The on-demand connection may occur when the vehicle 40 is remote from the computer 10.

Also, since the vehicle device 42 is a peripheral of the computer 10, services from the computer 10 may be requested by the device 42. Thus in the on-demand connection state, the vehicle may establish actual connection to the computer 10. This, for example, allows a user of the vehicle device 42 to search and transfer to the vehicle 40 or device 42 files from the computer 10, even if the vehicle 40 is remote from computer 10 and therefore out of reach of the short range connection.

If a connection is made from the computer 10 to the vehicle device 42 that is on-demand or virtual, a state manager in the vehicle device is set to recognize the on-demand or virtual connection. In one example, the vehicle includes access point communication capability, for example a short-range wireless transceiver 41, 45 that can connect to wireless access points. If the vehicle is in a location where a wireless access point is within communication range of the vehicle short-range device 41, 45, then the in-vehicle state manager can access the network, such as the Internet. Once connection is made to the network, a network connection is made from the vehicle device 42 to the computer 10 to convert the on-demand connection to a remote persistent connection state during the time that the vehicle has access to the access point. Upon leaving the access point, the on-demand connection function is reestablished, allowing the actual connection to disconnect and await a request for services requiring reestablishing the actual connection.

Figure 2:
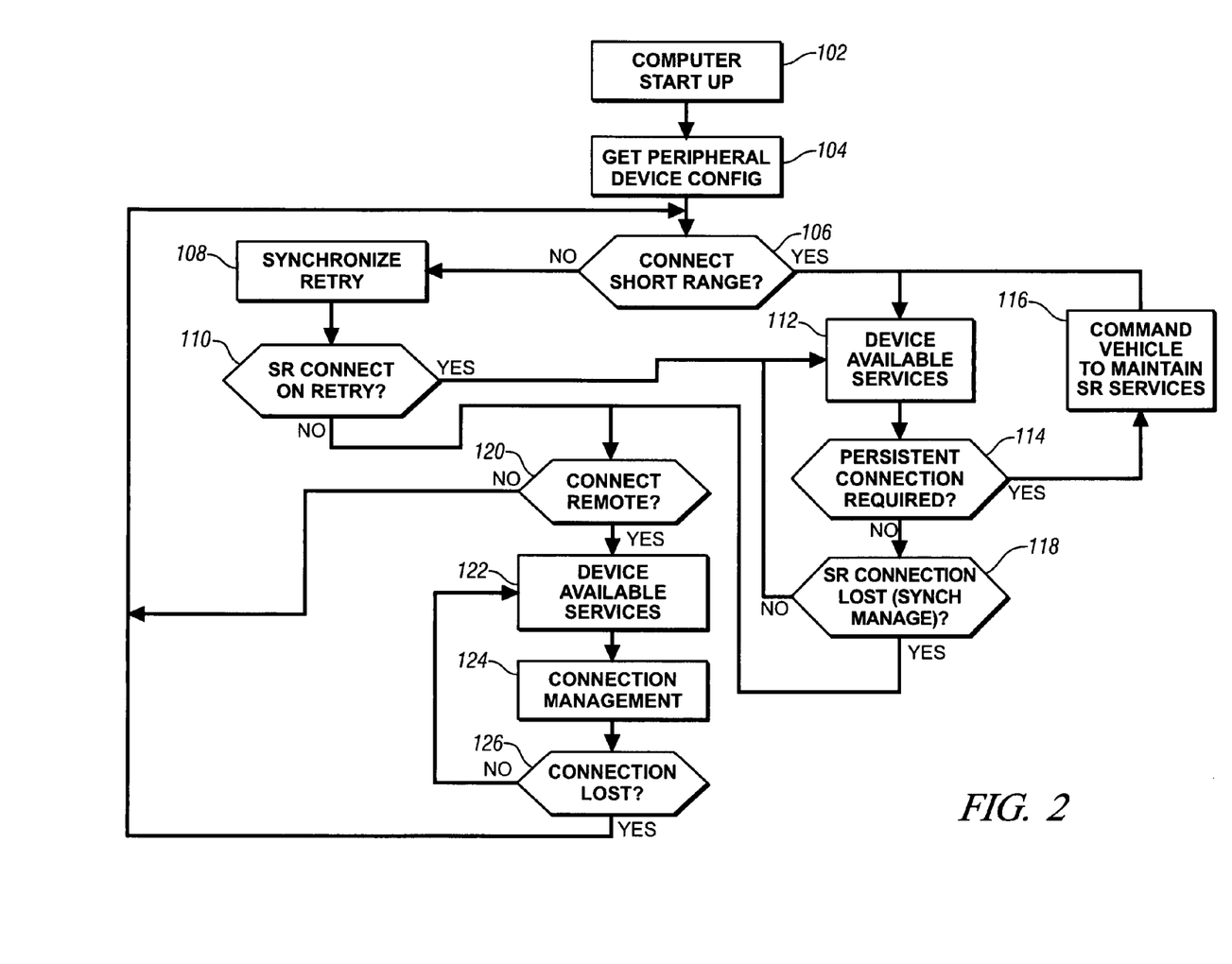
FIG. 2 illustrates example steps for short and long range connections for use with a system such as in FIG. 1.

Referring now to FIG. 2, after startup 102 of the computer, an example operating system obtains peripheral device configuration 104 in a known manner, checking operating system files and interrogating interfaces. With driver software for the in-vehicle device as a peripheral installed, the computer attempts a short-range connection to the vehicle at block 106. If a short-range connection is not available then the system attempts a short-range connection on a synchronized retry 108. In general, synchronized retry 108 assumes that the vehicle is within range of short-range connection, but is inactive. The vehicle is preferably programmed with a periodic wake-up state during which it will accept the short-range connection if an attempt is made. The synchronized retry 108 uses the computer internal clock to synchronize further attempts at short-range connection with a wake-up schedule of the in-vehicle device to attempt a short-range connection during wake-up. If a short-range connection is detected at block 110, the system moves to block 112, if not the operation moves to block 120.

The system indicates that the in-vehicle device is an available peripheral for services to the computer at block 112. The system determines whether a persistent connection is required at block 114 according to internal rules. In one example, if a user is interacting with the computer, then a persistent connection is flagged as required if a short-range connection is obtained. In another example, the persistent connection is flagged as required only if the computer requires services from the in-vehicle device—for example, for a file or data transfer to or from the vehicle. If persistent connection is required at 114, then block 116 sends a signal to the vehicle indicating that short-range services should be maintained. The vehicle responds to this by maintaining an awake mode until the persistent connection signal is terminated.

If the persistent connection is not required and no services are required from the vehicle, then the short-range connection is allowed to discontinue. Block 118 checks whether the connection is still available through synchronized reconnection during wake-up cycles of the vehicle. If the connection is not available, then the short-range connection is indicated not available and the operations move to block 120. Otherwise, the functions loop back to 112 and the computer continues to indicate that the in-vehicle device is available.

If short-range connection is not available, then a remote connection is attempted at block 120. If the remote connection is not available, then the system attempts again at an initial short-range connection at block 106, and continues as described above. If a remote connection is available, then the system recognizes the in-vehicle device as available 122 and moves into the connection management function 124, described in detail below with reference to FIG. 3.

If the remote connection is lost at 126, meaning the previously established remote connection is not available through the connection management 124, then the process returns to step 106, and the in-vehicle device is indicated as not available. If the remote connection is not lost, then the computer continues to indicate that the in-vehicle device is available for services.

Figure 3:
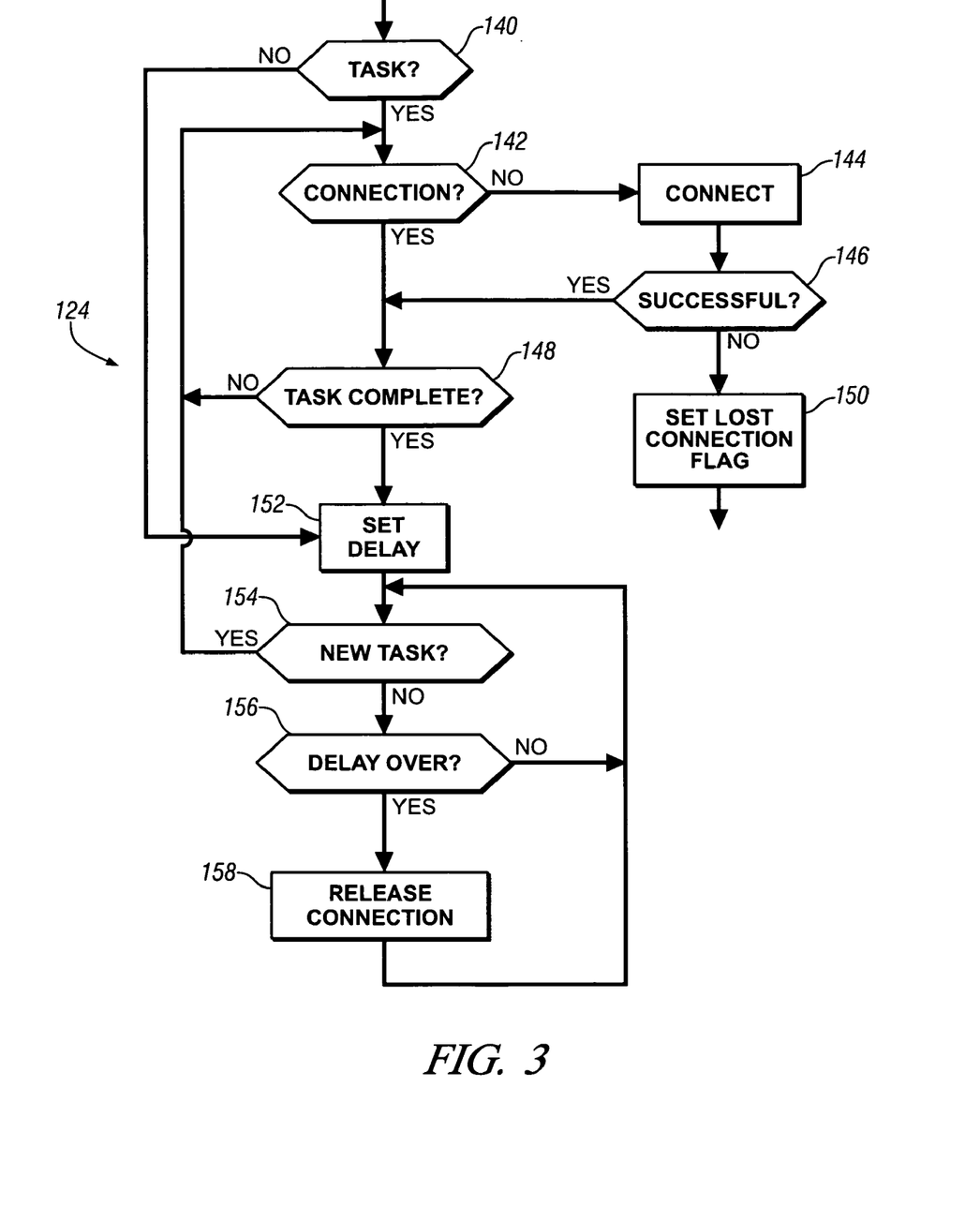
FIG. 3 illustrates example steps for connection management 124 in FIG. 2.

Referring now to FIG. 3, example steps for connection management 124 in FIG. 2 determine at 140 whether there is a service, task or function pending that requires interaction with the in-vehicle device as a peripheral device for the computer. If a task is not pending, then the operation moves to step 152. If a task is required, then block 142 inquires whether there is an actual connection to the in-vehicle device. If there is a connection, then block 148 checks whether the task is complete and if not, loops back to block 142. If the task is complete, then the operation continues to block 152.

Back at block 142, if an actual connection does not exist, then block 144 attempts to reestablish an actual connection to the in-vehicle device. This may involve a preprogrammed set of retries and may include connection attempts through various deices and strategies. For example, if the original connection was through a hot spot to the vehicle, a retry might include through a wireless calling and/or paging or broadband network. If the retry establishes the connection through an alternate means on retry, the connection to the vehicle is presented to the user as a continuation of the original connection, even through the connection method may be indicated to the user with a different status. For example, the computer may indicate, "Vehicle 1, Connected" with a connection method shown, such as "Internet," "Digital Wireless," etc.

If at block 146 the connection is successful, then the operation continues to block 148. Otherwise, the connection manager assumes that a connection is lost and cannot be reestablished on demand and sets a flag at block 150 indicating the lost connection. This flag may be used by block 126 in FIG. 2 for determining a control function when connection is lost.

At block 152, a delay timer is set. Block 154 checks for a pending new task requiring communication with the in-vehicle device. If a new task is pending, then the operation continues back to block 142. Otherwise, block 156 checks whether the delay timer is expired. If not, the operation returns to block 154. If the delay timer is expired, then block 158 releases the actual connection and moves back to block

154. Though the actual connection is released, the computer does not treat the connection as lost with the in-vehicle device unavailable until the connection manager attempts to reestablish the connection and fails, for example at block 144.

Figure 4:
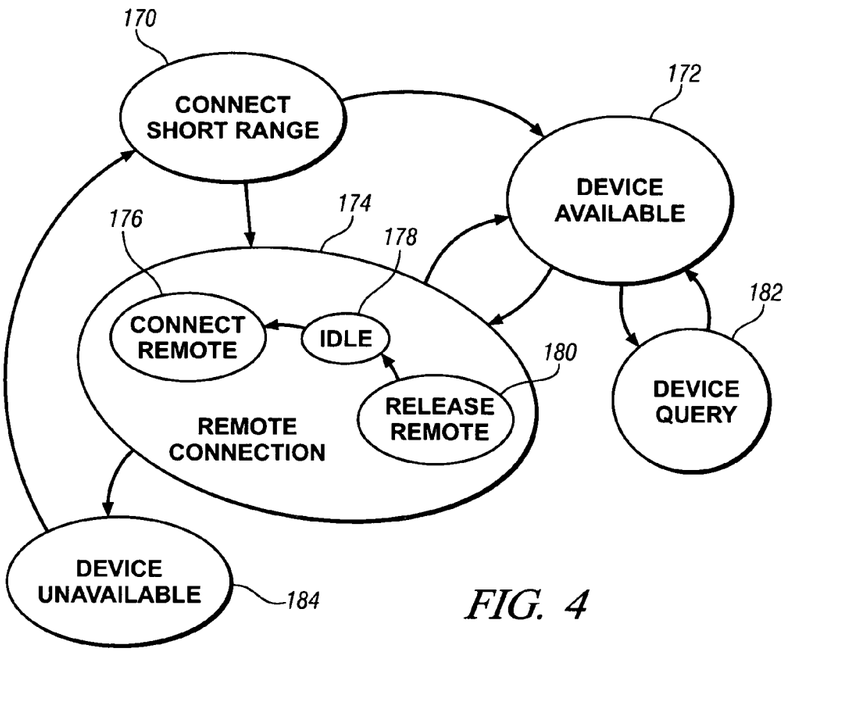
FIG. 4 is an example state diagram for connection management by a computer.

Referring now to FIG. 4, the example state diagram indicates two main states recognized by the computer for the in-vehicle device, device unavailable state 184 and device available state 172. The computer recognizes the in-vehicle device as being in the device unavailable state 184 when (a) the device cannot be connected, (b) when the connection is lost, or (c) during start-up of the computer. From state 184, the computer moves to the connect short-range state 170 automatically, for example during start-up, on a timed basis if a connection is lost or not available, or on demand for in-vehicle device services by a user or operator of the computer. The connect short-range state 170 attempts to connect to the in-vehicle device using a short-range wireless or wired link. If a connection is available, then the computer recognizes that the in-vehicle device is available and moves to the device available state 172. In this state 172, the computer presents the in-vehicle device as an available peripheral to a user of the computer and allows user interactions with the in-vehicle device as an available peripheral.

If the connect short range state 170 is not successful in connecting to the in-vehicle device, then the computer moves to the remote connection state 174. The remote connection state includes three sub-states, the connect remote state 176, idle state 178 and release remote state 180. Connect remote state 176 attempts remote connection to the in-vehicle device through the remote connection strategies identified herein and, if successful, the computer moves to the device available state 172. The device available state 172 interacts with the remote connection state to operate the virtual connection functions. When in the device available state 172 through remote connection state 174, the computer inquires whether services are required, as exemplified by the device query state 182. If services are required then the computer maintains the active connection. If not, then the computer may maintain the active connection for a period of time, or immediately move to the remote connection state 174, where release remote state 180 releases the actual in-vehicle device connection and moves to idle state 178. In the idle state 178, the computer maintains the in-vehicle device as an available peripheral awaiting user input or demand for services from other applications. Upon computer demand for services from the in-vehicle device, or for example, upon periodic status check, the computer moves to the connect remote state 176, where connection is made to the in-vehicle device allowing services to be executed.

If the connect remote state 176 is unable to achieve actual connection to the in-vehicle device after a number of attempts and using the various remote connection strategies set by the system implementer, then the computer moves to the device unavailable state 184, and the in-vehicle device is indicated as not available as a peripheral to a user of the computer until the device available state 172 is again achieved.

Figure 5:
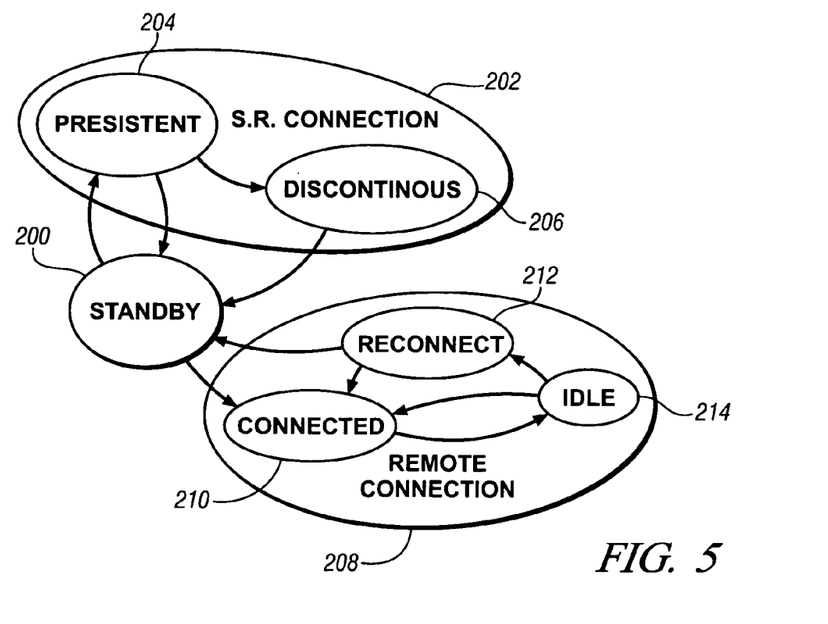
FIG. 5 is an example state diagram for connection management by a remote device such as an in-vehicle device.

Referring now to FIG. 5, an example in-vehicle device is operated under internal command control, for example through internal control software, to have three main states, standby state 200, short range connection state 202 and remote connection state 208. When in the standby state 200 and connection is made by the computer on a short-range link, the in-vehicle device moves to the persistent connection state 204. The persistent state is maintained as long as the connection is available and there is a demand for services from the in-vehicle device. The in-vehicle device may be subject to power-moding requirements to conserve battery life and thus a discontinuous state 202 may be implemented. The discontinuous state 202 is entered if there is no immediate need for services and allows the device to go into power-saving mode. In one example, the power saving mode puts the in-vehicle device into a sleep state to wake-up periodically, for example, during the first ten minutes of every hour for a predetermined time period after vehicle shutdown. This conserves energy while allowing the vehicle to periodically wake up and check for services.

From the discontinuous state 206, the in-vehicle device waits for the wake-up and reconnects on a short-range connection or moves to the standby state 200 if there is no connection during wake-up.

From the standby state 200, if a connection attempt is made from a computer over a remote connection, then the in-vehicle device moves to the remote connection state 208. Within state 208, the connected state 210 represents when an actual remote connection occurs, allowing services from the in-vehicle device. If the remote connection is released for an on-demand or virtual connection, then the in-vehicle device moves to the idle state 214. From the idle state 214, if there is a request for services by the in-vehicle device, then the in-vehicle device moves to the reconnect state 212 and attempts to establish an actual connection. Otherwise, if the computer initiates the actual connection, then the in-vehicle device moves to the connected state 210. Additionally, if a sufficient period of time lapses in the idle state, then the system moves to the reconnect state 212. If a there is no reconnection, then the in-vehicle device moves back to the standby state 200. Additionally, a discontinuous connection sub-state can be implemented for the remote connection state 208 to operate similarly to discontinuous state 206.

If in the standby state 200, a user in the vehicle utilizing the in-vehicle device desires services from the computer, the standby state 200 moves the in-vehicle device to the short range connection state 202 to attempt a connection to the computer and if that is not successful, moves the in-vehicle device to the remote connection state 208 to attempt connection to the computer. Once connection is made, the in-vehicle device, as a peripheral of the computer, has access to services of the computer. In one example, a user in the vehicle desires access to a file stored on the computer and that file is made available for transfer or access when the connection is made, either as a short range or long-range connection.

Figure 6:
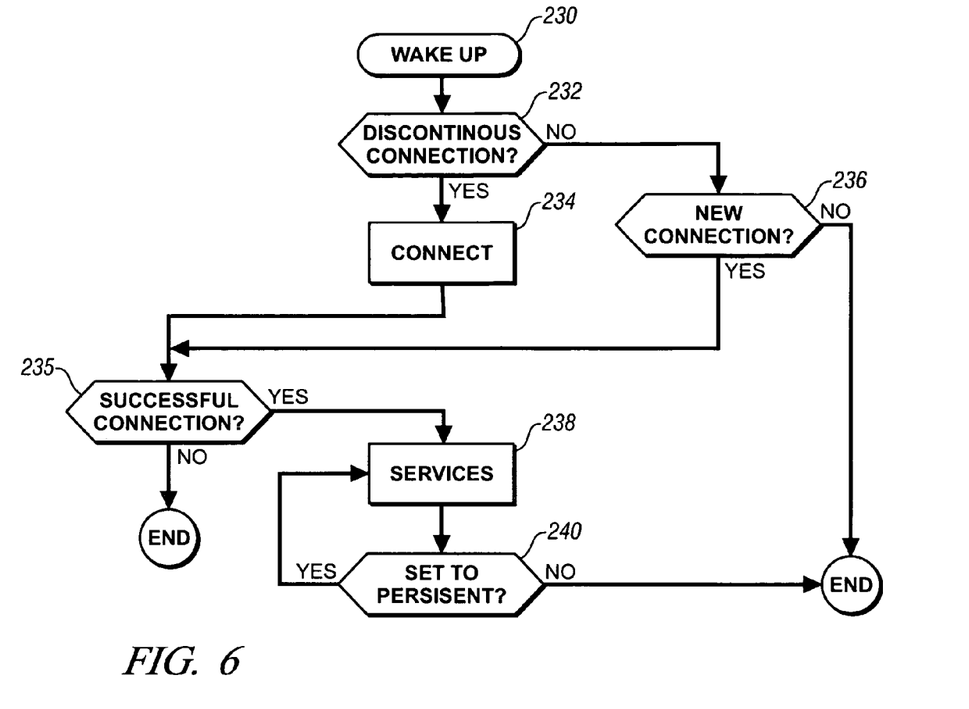
FIG. 6 illustrates example steps for connection management in a vehicle.

Referring to FIG. 6, example discontinuous operation of an in-vehicle device begins at step 230 where the vehicle or in-vehicle device wakes up from its sleep cycle. At 232, a check determines whether there is an existing discontinuous connection. An existing discontinuous connection in this context means that there was an existing actual connection made before the in-vehicle device went into sleep mode. Prior to entering sleep mode that connection is released, but maintained as a virtual connection by the computer and the in-vehicle device is shown as an available peripheral to a user of the computer.

If there is an existing discontinuous connection at block 232, it is reconnected at 234—reconnection can be attempted over multiple paths until a connection is made or a preprogrammed retry strategy is exhausted. Block 235 checks whether the connection is successful, and if so services are available as represented by block 238. Block 240 checks whether services are being used that require the connection to be set to persistent. If so, services continue to be available. Otherwise, the steps end. If at 232 there is no existing discontinuous connection, then block 236 checks whether a new connection is requested. If so, then the operation moves to block 235. Otherwise, the steps end.

Figure 7:
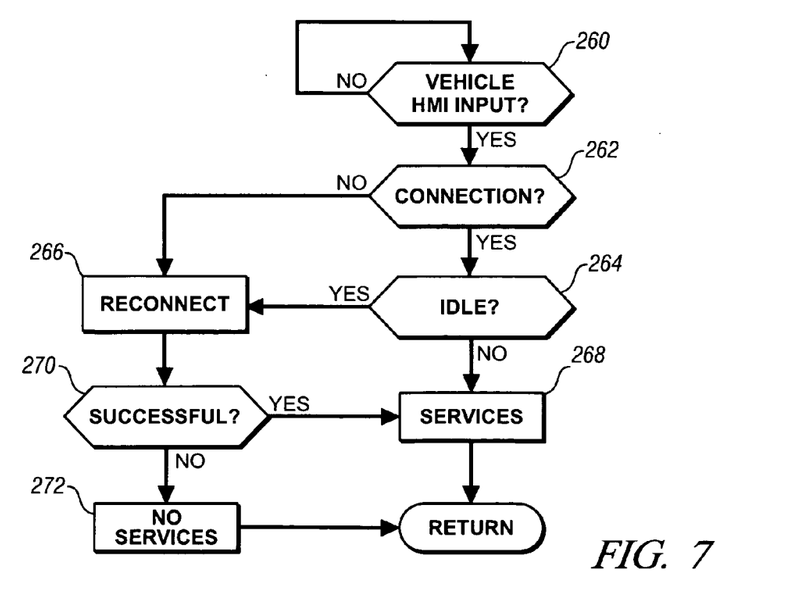
FIG. 7 illustrates example steps for connection management and services in a vehicle.

Referring to FIG. 7, the example steps beginning at 260 check for a user input in the in-vehicle device that requires interaction with the computer. If there is an input in the in-vehicle device that requires interaction with the computer, the in-vehicle device checks whether there is an existing connection to the computer at 262. If not, a new connection is attempted at 266.

If there is an existing connection at 262, then at 264 a check is made whether the connection is idle, or release but maintained as a virtual, discontinuous or on-demand connection. If so, a reconnection is attempted by the in-vehicle device at 266. If the connection or reconnection 266 is not successful, then services are not available at 272. The user of the in-vehicle device is informed, preferably on a display or by audible signal, that the requested operation cannot be completed. If the reconnection is successful, or if there was an existing connection, then services are available at 268. The requested operation is then completed.

Figure 8:
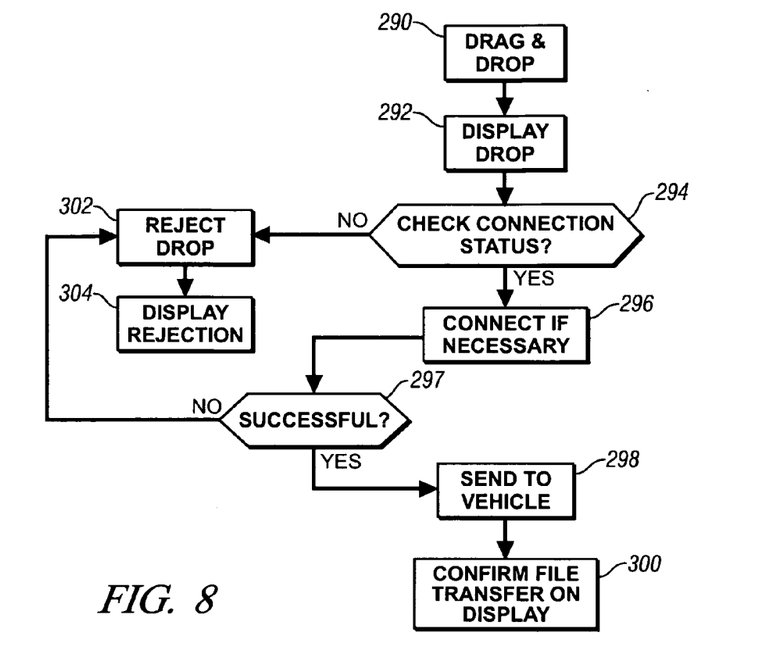
FIG. 8 illustrates example steps for use with a system such as in FIG. 1 for transferring files to a peripheral device.
Figure 10:
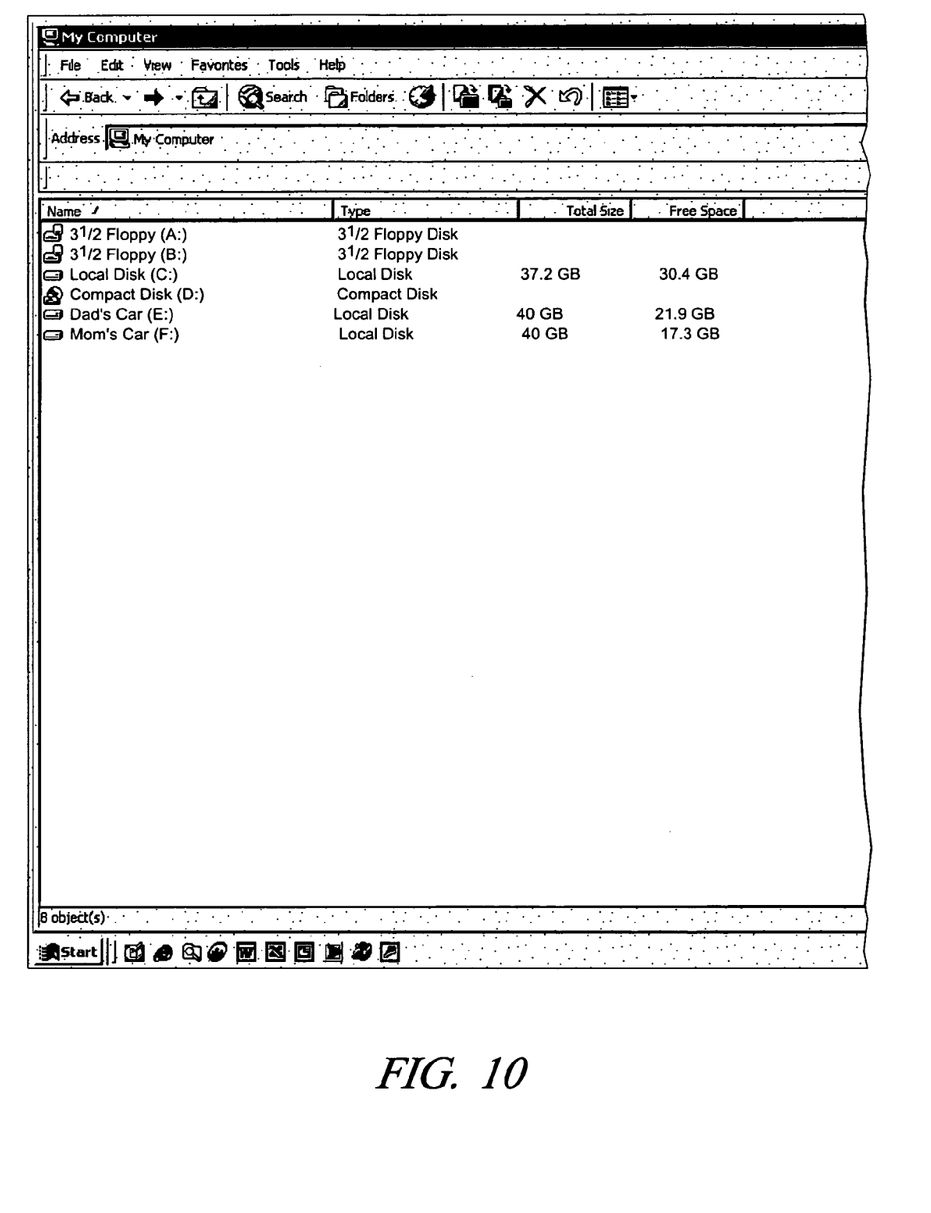
FIG. 10 illustrates an example user interface display.

Referring now to FIG. 8, in an example operation, a user provides an input 290 to the computer, such as a drag and drop of a file from an internal drive on the computer to a vehicle icon, such as "Dad's Car (E:)" or "Mom's Car (F:)" in FIG. 10. The drop is displayed at block 292. The connection status with the vehicle is checked at 294 and a reconnection is attempted if necessary at 296. If the connection is not available at 294 or 296/297, then the drop is rejected 302 and the computer displays the rejection 304 as an unsuccessful drag and drop to the user of the computer.

If a connection is available, then the file is sent to the vehicle 298 and the display to the user confirms the file transfer 300.

Figure 9:
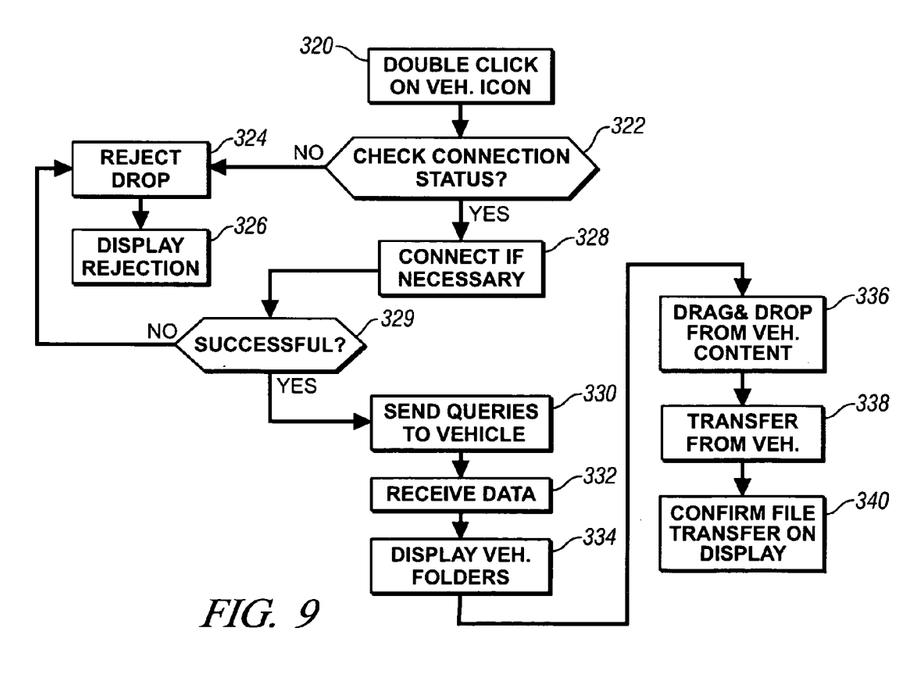
FIG. 9 illustrates example steps for use with a system such as in FIG. 1 for transferring files from a peripheral device to a computer.

In another example, referring to FIG. 9, a user may desire to transfer a file from storage in the in-vehicle device to storage on a hard drive or other memory internal to or directly connected locally to the computer. The user double clicks on the vehicle icon, such as "Dad's Car (E:)" or "Mom's Car (F:)" in FIG. 10. The computer checks the connection status 322 and if there is no connection available, rejects, or attempts a retry at 328/329. If there is no connection on an attempted connection or retry, then the computer rejects the user's attempt to access the in-vehicle device and displays the rejection at 326. If there is connection, the computer queries 330 the in-vehicle device and receives 332 the response data. The computer displays 334 the vehicle folders and files, allowing the computer user to drag and drop 336 from the vehicle storage device to another device on the computer. In response to the drag and drop command, the file or files are transferred 338 and the file transfer is confirmed 340 to the user on the computer display in a conventional manner.

The above examples with respect to FIGS. 8 and 9 illustrate drag and drop commands. These examples are illustrative and the connection management to obtain the in-vehicle device as a peripheral can be used to support any information or control command exchange between the in-vehicle device and the computer. The information or control command exchange can be in response to any operation on or acting through the computer and in response to operations in the vehicle. These operations can be automated or in response to user inputs.

In FIG. 10 a hierarchy is apparent for the computer device. Within the "My Computer" designation there are various storage devices available to the computer, including internal devices and at least two peripherals, identified as "Dad's Car (E)" and "Mom's Car (F)." Though each vehicle is sometimes within range or short range connection to the computer and sometimes can only be connected through a remote connection, the vehicles are within the hierarchy of devices under control of the computer, such as computer 10 in FIG. 1.

The invention claimed is:

1. A computer peripheral device method comprising the steps of:
    initiating a first connection from a computing device to a vehicle device wherein the first connection is a wired or a short-range wireless connection, wherein the computing device is external to and not physically part of the vehicle, and the vehicle device is within the vehicle;
    designating on the computing device the vehicle device as a peripheral device if the first connection is achieved;
    initiating a second connection from the computing device to the vehicle device if the first connection is not available, wherein the second connection is not a short-range wireless connection or a wired connection;
    designating on the computing device the vehicle device as the peripheral device if the second connection is achieved;
    disconnecting the second connection while maintaining the vehicle device as the peripheral device, and reestablishing connection to the vehicle upon demand for services from the vehicle.

2. An apparatus comprising:
    a computing device spatially separated from a vehicle;
    a device driver software on the computing device, wherein with the device driver software installed on the computing device, the computing device recognizes the vehicle or a device in the vehicle as a peripheral of the computing device, operates a first connection to the vehicle when the vehicle is in proximity of the computing device allowing a short range connection, and
    operates a second long-range connection to the vehicle when the vehicle is not in proximity of the computing device and the short-range connection is not available;
    wherein the long-range connection is selectively released while the computing device maintains the device as an available peripheral; and
    wherein the long-range connection is reconnected upon demand for services.

3. The apparatus of claim 2, also comprising a vehicle driver software installed on the computing device.

4. The apparatus of claim 3, also comprising a device control application on the computer for controlling operation of a plurality of devices for managing the short-range connection and the long-range connection.

5. The apparatus of claim 2, wherein the long-range connection is reconnected upon a demand by the computing device for services from the device.

6. The apparatus of claim 2, wherein the long-range connection is reconnected upon request of the device for services from the computing device.

7. The apparatus of claim 2, wherein the short-range connection is obtained during synchronization with a wake-up cycle of the device in the vehicle.

8. The apparatus of claim 2, wherein if the short-range connection is lost the long-range connection is established.

9. The apparatus of claim 2, wherein requested services are rejected if both the short-range connection is not available and the long-range connection is not available.

10. The apparatus of claim 2, wherein following startup of the computing device, the short-range connection is established.

11. The apparatus of claim 2, wherein following startup of the computing device, the long-range connection is established if the short-range connection is not available.

* * * * *